United States Patent
Nieman et al.

(10) Patent No.: US 6,666,583 B2
(45) Date of Patent: Dec. 23, 2003

(54) BEARING RETENTION ASSEMBLY HAVING CAM CHAMFERED BEARING RACE RING

(75) Inventors: Thomas John Nieman, Livonia, MI (US); Vinh Hiep Luong, Westland, MI (US); Robert John Mohrmann, Pinckney, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/005,111

(22) Filed: Dec. 4, 2001

(65) Prior Publication Data

US 2003/0103704 A1 Jun. 5, 2003

(51) Int. Cl.[7] .............................................. F16C 43/04
(52) U.S. Cl. ......................................... 384/537; 384/585
(58) Field of Search ................................ 384/537, 584, 384/585, 906; 29/898.04, 898.041, 898.043, 898.054, 898.063

(56) References Cited

U.S. PATENT DOCUMENTS

| | | | | |
|---|---|---|---|---|
| 1,489,013 A | * | 4/1924 | Schatz ........................ 384/506 |
| 2,194,817 A | | 3/1940 | Boiu ........................... 308/193 |
| 2,239,154 A | | 4/1941 | Keane ......................... 308/236 |
| 3,662,462 A | * | 5/1972 | Shiflet ..................... 29/898.045 |
| 3,679,279 A | * | 7/1972 | Van Dorn et al. ........... 384/537 |
| 3,709,574 A | * | 1/1973 | Potter ......................... 384/585 |
| 3,897,988 A | * | 8/1975 | Dickinson et al. .......... 384/539 |
| 3,920,341 A | * | 11/1975 | Atwater et al. ............. 403/352 |
| 4,125,298 A | * | 11/1978 | Heurich et al. ............. 384/537 |
| 4,243,277 A | * | 1/1981 | Fortuna ....................... 384/449 |
| 4,302,927 A | * | 12/1981 | Hope, Sr. ..................... 57/122 |
| 4,506,936 A | * | 3/1985 | Miller ......................... 384/569 |
| 4,640,632 A | | 2/1987 | Brandenstein et al. ...... 380/537 |
| 4,756,640 A | * | 7/1988 | Gehrke ........................ 403/326 |
| 4,784,438 A | * | 11/1988 | Fikse ........................... 299/110 |
| 4,848,938 A | * | 7/1989 | Haas et al. .................... 84/606 |
| 5,007,746 A | * | 4/1991 | Matzelle et al. ............. 384/420 |
| 5,058,262 A | * | 10/1991 | Brockmuller et al. ......... 29/725 |
| 5,061,089 A | * | 10/1991 | Bair et al. .................. 384/535 |
| 5,172,984 A | * | 12/1992 | Lederman .................... 384/489 |
| 5,226,738 A | * | 7/1993 | Valette et al. ............... 384/513 |
| 5,462,369 A | | 10/1995 | Layne et al. ................ 384/538 |
| 5,490,732 A | * | 2/1996 | Hofmann et al. ........... 384/537 |
| 5,536,075 A | | 7/1996 | Bertetti ..................... 301/105.1 |
| 5,538,349 A | * | 7/1996 | Morris et al. ............... 384/585 |
| 5,822,860 A | * | 10/1998 | Wadsworth-Dubbert et al. ..................... 29/898.061 |
| 5,999,373 A | * | 12/1999 | Allsup et al. ............. 360/265.6 |
| 6,129,455 A | * | 10/2000 | Galante ....................... 384/537 |
| 6,270,260 B1 | * | 8/2001 | Hale .......................... 384/537 |
| 6,318,900 B1 | * | 11/2001 | Bere et al. .................. 384/535 |
| 6,505,973 B2 | * | 1/2003 | Buchheim et al. .......... 384/537 |

FOREIGN PATENT DOCUMENTS

DE        26 11 218 A1    10/1977

* cited by examiner

*Primary Examiner*—David A. Bucci
*Assistant Examiner*—Julie K. Smith
(74) *Attorney, Agent, or Firm*—Brinks Hofer Gilson & Lione

(57) ABSTRACT

In one aspect of the invention, a bearing retention assembly is provided. The assembly includes a bearing set having an annular outer race ring. The outer race ring has a plurality of circumferentially spaced cam chamfers on at least one outer circular edge. The assembly also includes a bearing housing for capturing the bearing set. The bearing housing includes at least one integral securing member for interfering with and engaging at least one cam chamfer for axially and rotatably securing the outer race ring relative to the housing.

13 Claims, 5 Drawing Sheets

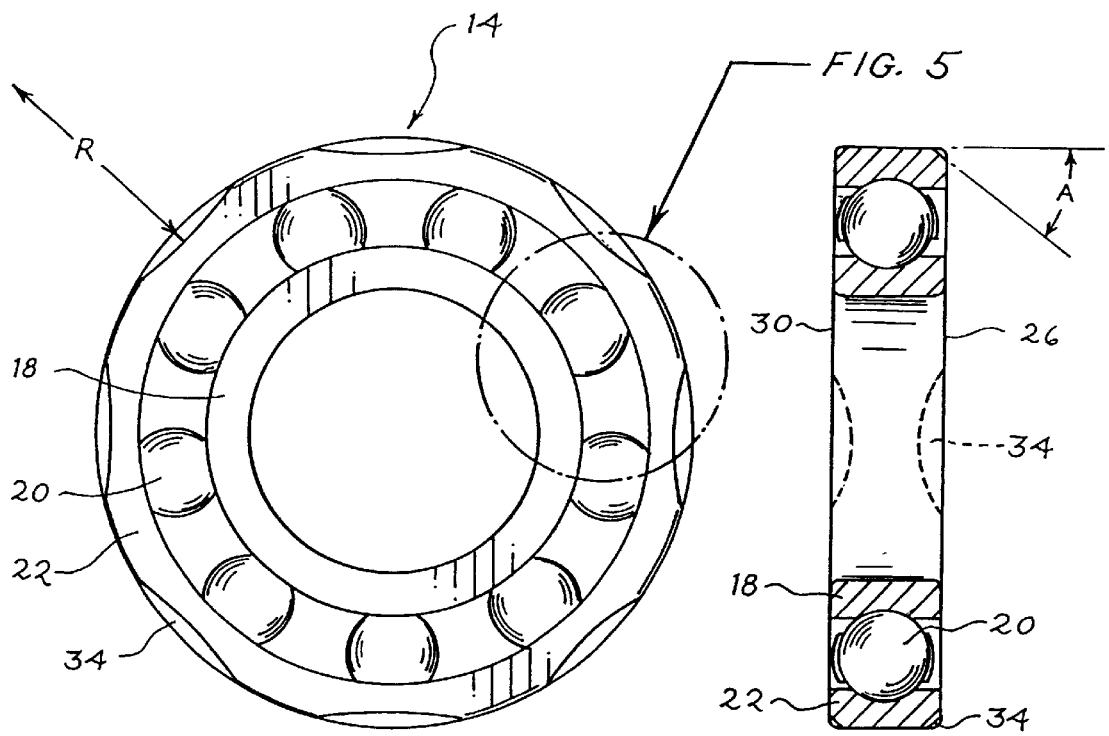
Fig. 3
Fig. 4
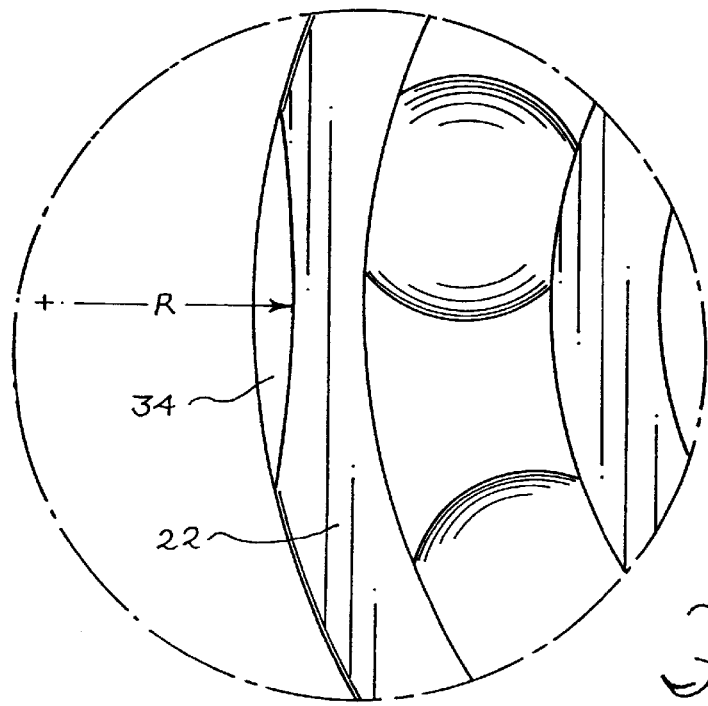
Fig. 5

BEARING RETENTION ASSEMBLY HAVING CAM CHAMFERED BEARING RACE RING

FIELD OF THE INVENTION

The present invention relates generally to an assembly for securing a bearing within a housing, and more particularly, to an improved arrangement for axially and rotatably securing a bearing.

BACKGROUND

In a typical bearing assembly, a plurality of load-bearing elements, such as rollers or spheres, are disposed between an inner race and a separate outer race to permit the inner and outer race to rotate relative to each other with minimal friction. In a known arrangement, the inner race is attached to and rotates with a shaft while the outer race is secured to a fixed housing. Alternatively, the inner race may be attached to a stationary shaft while the outer race is secured to a rotating housing.

Traditional methods used to secure a bearing within a bearing opening or bore of a housing include the use of a sleeve-like bearing retainer having a coefficient of thermal expansion near to that of the bearing outer race. The outer race of the bearing is pressed into the bearing retainer for frictional engagement therewith. The bearing retainer is received within the bearing opening and may be provided with a radially-extending flange that is bolted or attached by some other suitable means to the housing. This configuration ideally prevents axial movement and prevents rotation of either the bearing outer race or the retainer relative to the housing.

Alternatively, the housing bore may be configured over its axial length to permit insertion of a bearing retainer having a leading end with radially-extending retaining members defining a noncircular overall profile. After the leading end of the bearing retainer is axially inserted through the housing bore to a position axially forward of the bore, the bearing retainer is rotated to an installed orientation in which the retaining members engage the outer surface of the housing to prevent axial movement of the bearing retainer back through the bore. A suitable anti-rotation device, such a pin, bolt or retainer plate having a radially extending tab engaging a flat defined by the bearing retainer, is used to prevent rotation of bearing retainer from its installed orientation.

One of the disadvantages of the bearing retainer arrangements of the aforementioned types is that a separable bearing retainer adds an extra component cost to the bearing assembly. In addition, bearing assemblies using a bearing retainer may be of limited use under certain environmental conditions because they rely solely on thermal expansion material properties to secure a bearing outer race within the bearing retainer. Moreover, the need for means to secure the bearing retainer within a bearing housing, such as a pin or a bolt, may subject these bearing retainer arrangements to physical design constraints that restrict their use in certain applications.

Those skilled in the art have also utilized a locking clip to non-rotatably secure a bearing outer race to a housing. The locking clip is a projecting key fastened within a groove extending across the outer surface of a bearing outer race and extending into a cooperating opposed groove on the inner wall of a housing receiving the bearing outer race. The locking clip arrangement is typically unable to axially secure the bearing outer race relative to the housing and to more permanently secure the bearing against rotation in the housing.

Another known method for axially positioning a bearing within the bore of a guide roller includes the use of projections, such as beads and notches. These projections extend from the guide roller in a radial direction to engage the side of a bearing outer race at several positions about its circumference. An axially directed stamp is used to squeeze material into the bore for the formation of lugs to engage the other side surface of the bearing outer race. The disadvantage of this method is that the bearing is only positioned and securely held axially.

In the area of bearing retention assemblies, there continues to be a need for an inexpensive and simple construction for axially and rotatably securing a bearing relative to a bearing housing.

SUMMARY

In one aspect of the invention, a bearing retention assembly is provided. The assembly includes a bearing set having an annular outer race ring. The outer race ring has a plurality of circumferentially spaced cam chamfers on at least one outer circular edge. The assembly also includes a bearing housing for capturing the bearing set. The bearing housing includes at least one integral securing member for interfering with and engaging at least one cam chamfer for axially and rotatably securing the outer race ring relative to the housing.

In another aspect of the invention, the outer race ring of the bearing retention assembly includes at least one annular surface and an outer circular face. The annular surface and the outer circular face define an outer circular edge. The outer race ring further defines a plurality of spaced, outwardly disposed cam chamfers disposed at circumferential locations of the outer circular edge.

In yet another aspect of the invention, a method of axially and rotatably securing a bearing set having an outer race ring within a bearing housing having a bearing opening is provided. The method includes providing a plurality of circumferentially spaced chamfers on at least one outer circular edge of said outer race ring. The bearing opening is provided with at least one inwardly projecting integral securing member at a location of the bearing opening corresponding to a location of at least one cam chamfer. The method further includes press-fitting the bearing set into the bearing housing and deforming the integral securing member radially inwardly sufficiently to engage the corresponding cam chamfer.

In another aspect of the invention, the inner race ring of the bearing retention assembly includes at least one annular surface and an inner circular face. The inner face defines an inner opening. The annular surface and the inner circular face define at least one circular edge. The inner race ring further includes a plurality of spaced, outwardly disposed cam chamfers disposed at circumferential locations of said at least one circular edge.

Other aspects of the invention will be apparent to those skilled in the art in view of the following description in conjunction with the accompanying drawings.

BRIEF DESCRIPTION OF THE DRAWINGS

FIG. 3 is a planar view of the bearing assembly shown in FIG. 2;

FIG. 4 is a side view of the bearing assembly shown in FIG. 2;

FIG. 5 is an enlarged planar view of a cam chamfer portion of the bearing assembly shown in FIG. 3;

DETAILED DESCRIPTION OF THE PREFERRED EMBODIMENTS

Figure 1:
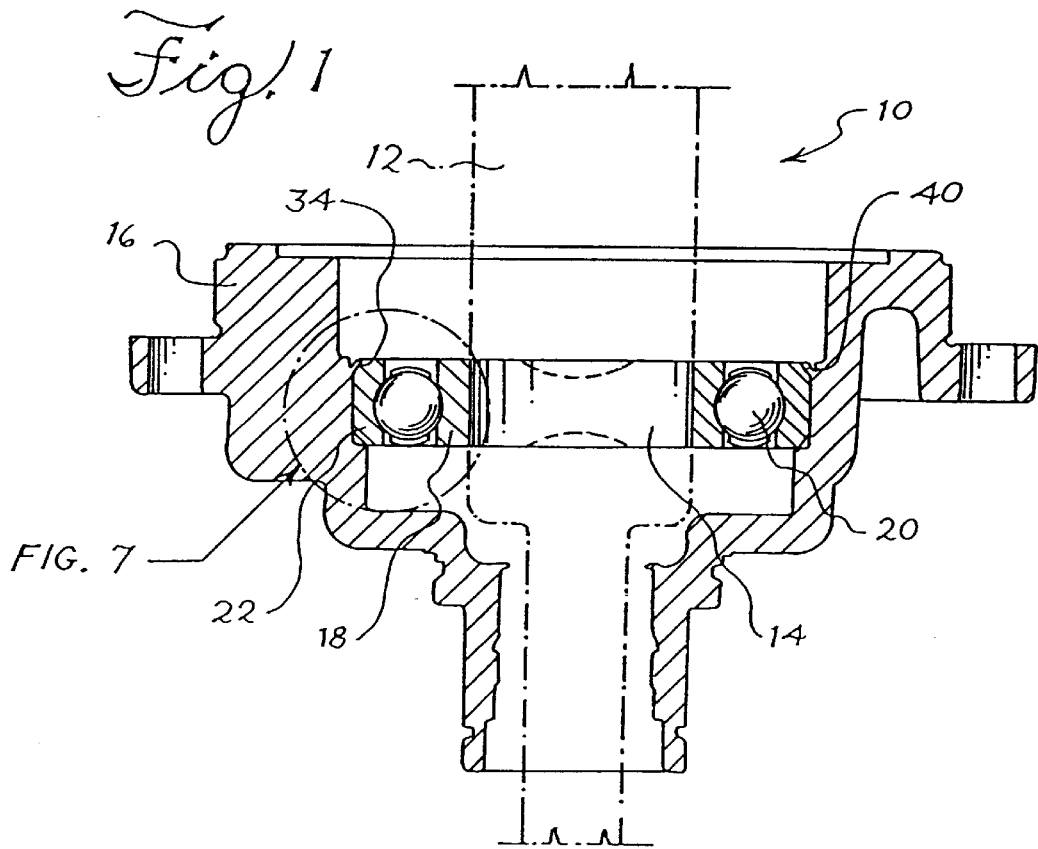
FIG. 1 is a cutaway view of a bearing assembly in accordance with the present invention.

Referring now to the drawings and initially to FIG. 1, one embodiment of a bearing assembly made according to the present invention is indicated generally at 10. The bearing assembly 10 includes a shaft 12 passing through a bearing set 14, which is received within a bearing housing 16.

Figure 2:
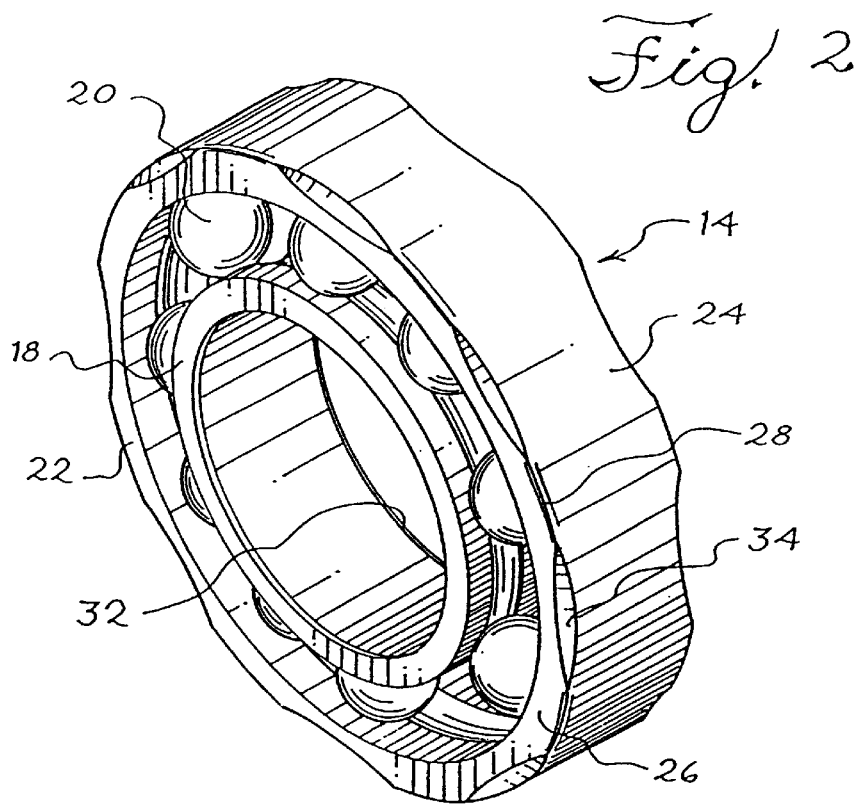
FIG. 2 is a perspective view of the bearing assembly of FIG. 1.

Referring next to FIGS. 2–4, the bearing set 14 preferably has an inner race ring 18, a separate outer race ring 22 and a plurality of load-bearing members 20 arranged radially between the outer race ring 22 and the inner race ring 18. The load-bearing members 20 may be spherical members as shown in FIGS. 2–4 or some other suitable load-bearing elements such as rollers (not shown), as are well-known in the art.

The outer race ring 22 has an outer circular face 24 and a top annular surface 26 which intersect at a top outer circular edge 28. Likewise, the outer race ring 22 has a bottom annular surface 30 that intersects the outer circular face 24 at a bottom outer circular edge 32. In the preferred embodiment, the projected top annular surface and the bottom annular surface each intersect the projected outer circular face at a 90 degree angle to form a right cylinder with a small outer edge radius, although other angles forming generally beveled edges could be utilized. The outer race ring 22 shown in FIGS. 2–4 is further provided with a plurality of spaced, outwardly disposed cam chamfers 34 that are formed at circumferential locations of the top outer circular edge 28 and the bottom outer circular edge 32.

The cam chamfers 34 may be spaced symmetrically or asymmetrically along the circumference of the top outer circular edge 28 and the bottom outer circular edge 32. The cam chamfers 34 may or may not be disposed at opposing locations along the top outer circular edge 28 and the bottom outer circular edge 32. For example, in the embodiment of the assembly shown in FIGS. 2–4, eight cam chamfers 34 are symmetrically disposed along the circumference of the top outer circular edge 28 and another eight cam chamfers 34 are likewise symmetrically disposed at opposing locations along the circumference of the bottom outer circular edge 32. This cam chamfer arrangement on the outer race ring 22 enables the bearing set 14 to be mounted within the bearing opening 36 as described below without reference to a preferred direction. However, it is not necessary that both the top outer circular edge 28 and the bottom outer circular edge 32 define the cam chamfers 34. Those skilled in the art will recognize that the cam chamfers 34 alternatively may be disposed along the circumference of either the top outer circular edge 28 or the bottom outer circular edge 32 only.

In addition, the cam chamfers 34 may be generally cusped or crescent shaped with a radius R, shown in FIGS. 3 and 5, of 1 mm or greater. In one embodiment, the radius R of cam chamfers 34 is preferably about 150 mm when the diameter of the outer race ring 22 is about 72 mm. Alternatively, the cam chamfers 34 may be planar with a radius R of 0 mm. Likewise, the angle A, shown in FIG. 4, of the cam chamfers 34 could range, for example, between about 20 degrees and about 70 degrees. More preferably, the angle of the cam chamfers could be about 45 degrees. In fact, one skilled in the art will recognize that the location and geometry of the cam chamfers 34 may vary and are less important than having a plurality of cam chamfers formed by conventional methods spaced on the top outer circular edge 28 or the bottom outer circular edge 32 of the outer race ring 22.

Figure 6:
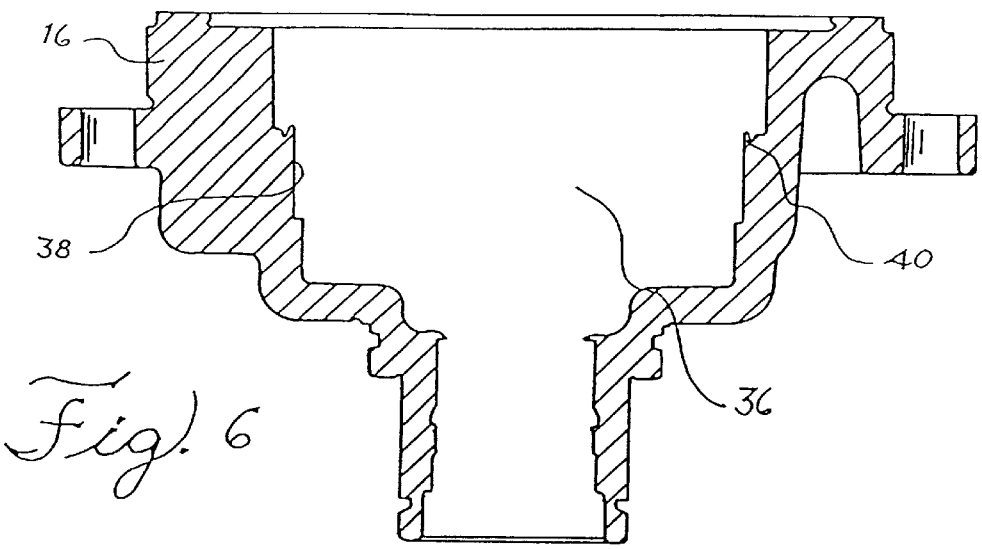
FIG. 6 is a cutaway view of the bearing housing shown in FIG. 1.

Referring next to FIGS. 1 and 6, the bearing housing 16 is a unitary component having an integral bearing opening 36 for receiving the bearing set 14. The bearing opening 36 is machined to slightly smaller dimensions than the outer race ring 22 to provide a tight interference fit with the outer race ring. This allows the bearing set 14, including the outer race ring 22, to be press-fit in the bearing opening 36. However, the possibility remains that the outer race ring 22 could rotate relative to the bearing housing 16 due to the frictional forces exerted by the rotating load-bearing members 20 on the outer race ring 22.

Figure 7:
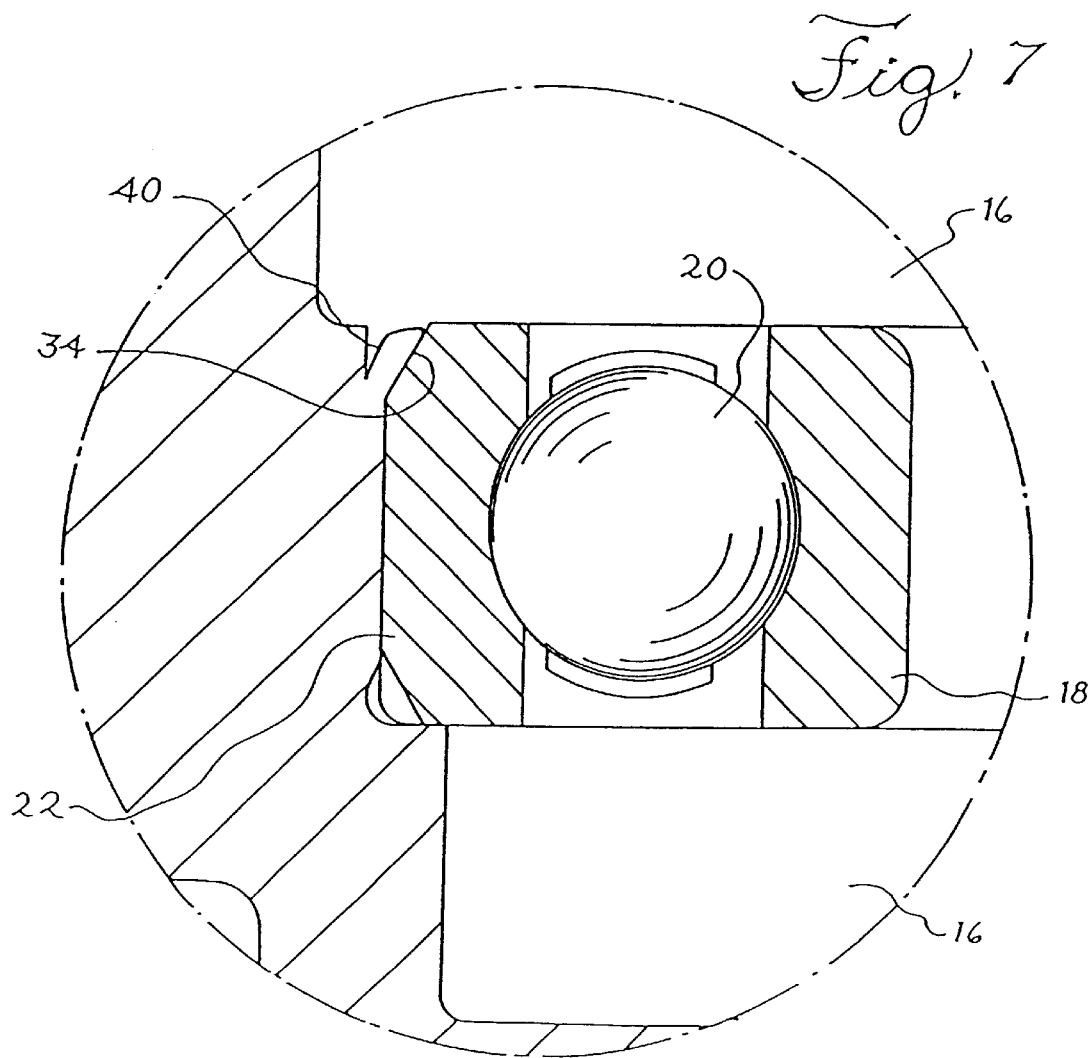
FIG. 7 is an enlarged cutaway view of the bearing assembly of FIG. 1, illustrating an integral securing member engaging a cam chamfer in accordance with the present invention.

In order to axially and rotatably secure the outer race ring 22 with respect to the bearing housing 16, the inner wall portion 38 defining the bearing opening 36 is provided with a plurality of integral securing members 40. The integral securing members 40 formed by machining or casting or molding or other known methods of forming the bearing housing 16. The integral securing members 40 are spaced at locations along the inner wall portion 38 corresponding with the locations of the cam chamfers 34 on the outer race ring 22 as shown in FIG. 1. The integral securing members 40 need not have any particular geometry so long as each securing member has sufficient material and strength to firmly engage a corresponding cam chamfer 34. The bearing set 14 is aligned before it is press-fit within the bearing opening 36 such that each integral securing member 40 substantially overlaps a corresponding cam chamfer 34. After the bearing set 14 is press-fit in the bearing opening 36, one or more of the integral securing members 40 is deformed at least partially radially inwardly on said cam chamfers using a suitable tool, such as a staking tool, a punching tool or a crimping tool (not shown), until the integral securing member 40 substantially fills a gap between the inner wall portion 38 and the cam chamfer 34 and engages the cam chamfer 34 as shown in FIG. 7. The deformed integral securing members 40 interfere with the outer race ring 22 and therefore act to prevent it from moving axially or rotating within the bearing opening 36.

Alternatively, an integral securing member 40 forming a deformable continuous annular lip may be used (not shown) to secure and engage at least one cam chamfer 34 on the top outer circular edge 28 or the bottom outer circular edge 32. Once the bearing set 14 is press-fit in the bearing opening 36, the continuous annular lip integral securing member 40 is deformed using a suitable tool, such as a staking tool, a punching tool or a crimping tool (not shown), to form crimps that substantially fill the gaps between the inner wall portion 38 and the cam chamfers 34 and engage the cam chamfers 34 to interfere with any rotation or axial movement of the outer race ring 22.

Those skilled in the art will readily recognize that many materials which can be formed using a staking tool or other suitable device may be used for the bearing housing 16 of the present invention. In a preferred embodiment of the invention, the bearing housing 16 is made from cast aluminum. In another preferred embodiment of the invention, the bearing housing is made of plastic. Other materials, such as steel, may also be used. Also, the outer race ring 22 and the bearing housing 16 preferably are made of materials having substantially different coefficients of thermal expansion. As a result of this construction, the outer race ring 22 could be further wedged within the bearing opening 36 at elevated operating temperatures of the bearing assembly because the integral securing members 40 generally would expand to further interfere with and engage the cam chamfers 34.

Figure 8:
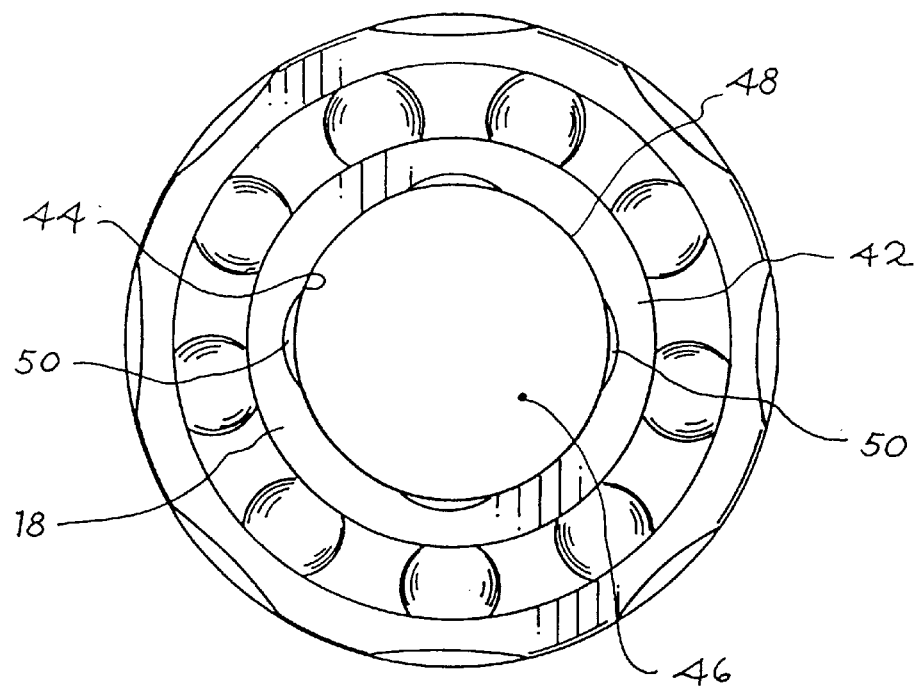
FIG. 8 is a planar view of another bearing assembly, illustrating an inner race ring having cam chamfers in accordance with the present invention.
Figure 9:
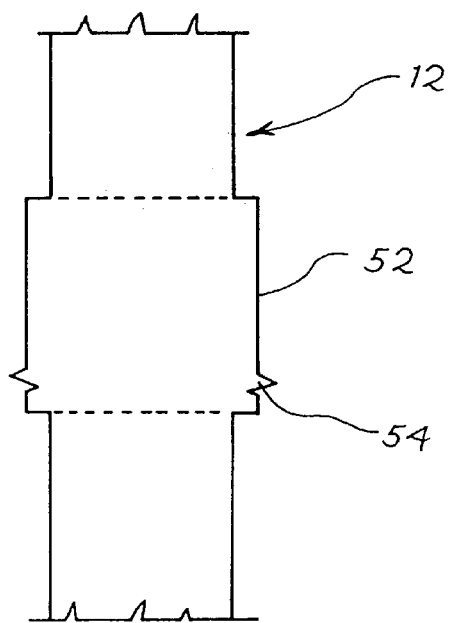
FIG. 9 is a planar view of a s haft adapted to be secured to the inner race ring of FIG. 8.

In another embodiment, the inner race ring 18 of the bearing set 14 is rotatably mounted on the shaft 12 using means well-known in the art. Referring next to FIGS. 8–9, in order to rotatably secure the inner race ring 18 on the shaft 12, the inner race ring 18 may also be provided with cam chamfers 50 in a manner similar to the outer race ring 22 described above. The inner race ring 18 has an annular surface 42, an inner circular face 44, an inner opening 46 defined by the inner circular face 44, and a circular edge 48 defined by the annular surface 42 and the inner circular face 44, as shown in FIG. 8. The inner race ring 18 further defines a plurality of spaced, outwardly disposed cam chamfers 50 that are formed at circumferential locations of the circular edge 48. Again, one skilled in the art will recognize that the location and geometry of the cam chamfers 50 may vary and are less important than having a plurality of cam chamfers formed by conventional methods spaced on the circular edge 48 of the inner race ring 18.

The shaft 12 has a mounting portion 52 adapted to be received within the inner opening 46 of the inner race ring 18, as shown in FIG. 9. The mounting portion 52 is machined to slightly larger dimensions than the inner opening 46 to provide a tight interference fit with the inner race ring 18. This allows the bearing set 14, including the inner race ring 18, to be press-fit on the shaft 12. The mounting portion 52 of the shaft 12 is provided with a plurality of integral securing members 54, formed when the shaft is machined, cast, molded, or otherwise formed. The members 54 are spaced at locations along the mounting portion 52 substantially corresponding with locations of the cam chamfers 50 on the inner race ring 18. The integral securing members 54 need not have any particular geometry so long as each integral securing member 54 has sufficient material and strength to firmly engage a corresponding cam chamfer 50. The shaft 12 is aligned before it is press-fit within the inner opening 46 such that each integral securing member 54 substantially overlaps a corresponding cam chamfer 50. After the shaft 12 is press-fit in the inner opening 46 such that each securing 54 member provided adjoins a corresponding cam chamfer 50, one or more of the integral securing members 54 is deformed radially outwardly using a suitable tool, such as a staking tool, a punching tool or a crimping tool (not shown), until the deformed integral securing member 54 substantially fills and engages a cam chamfer 50. The deformed integral securing members 54 interfere with the inner race ring 18 and therefore act to prevent it from moving axially or rotating relative to the shaft 12.

Figure 10:
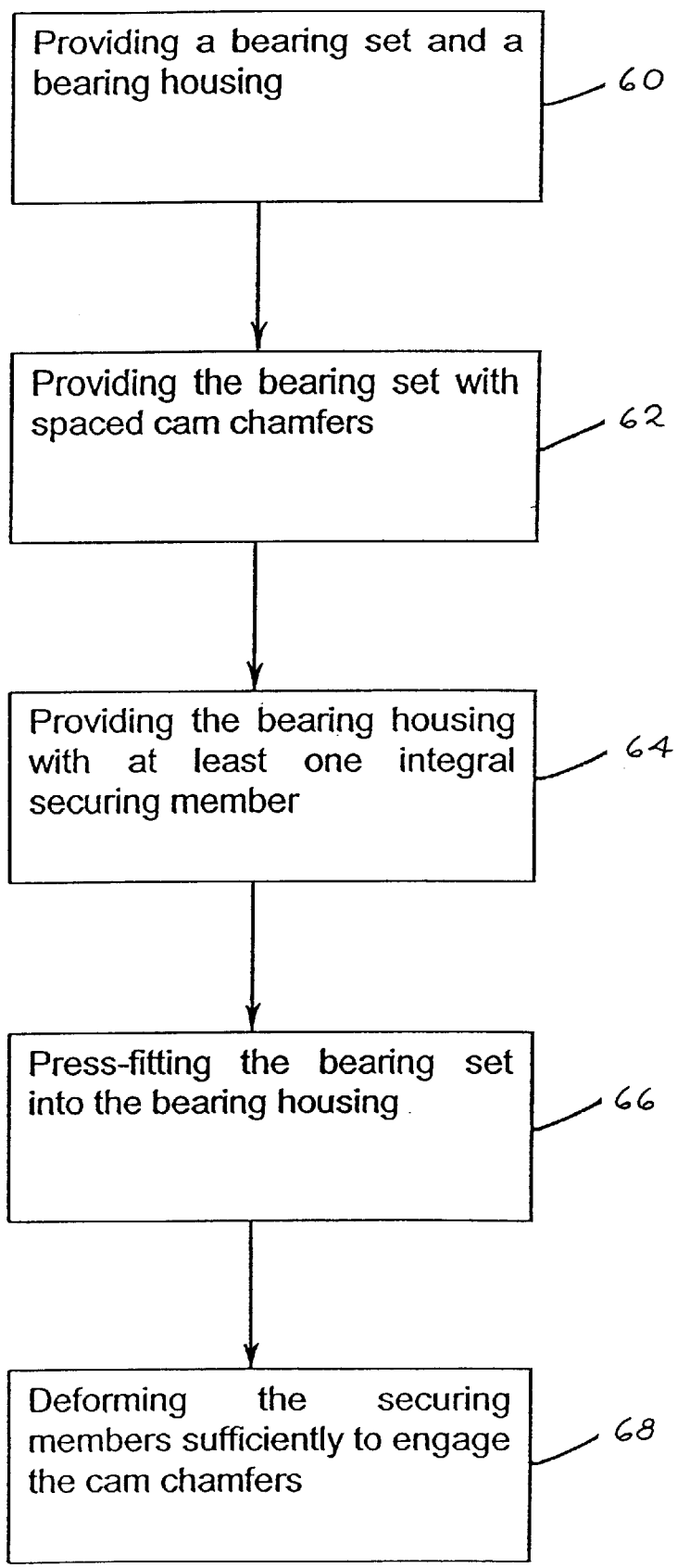
FIG. 10 is a flowchart for a method of axially and rotatably securing a bearing set within a bearing housing in accordance with the present invention.

In yet another embodiment, a method of axially and rotatably securing a bearing set within a bearing housing is provided, as shown in FIG. 10. The method includes the step 60 of providing a bearing set including an outer race ring and a bearing housing having a bearing opening. The method further includes the step 62 of providing a plurality of circumferentially spaced chamfers on at least one outer circular edge of said outer race ring. The bearing opening is provided with at least one inwardly projecting integral securing member at a location of the bearing opening corresponding to a location of a cam chamfer at step 64. The method further includes the step 66 of press-fitting the bearing set into the bearing housing and the step 68 of deforming the integral securing member radially inwardly sufficiently to engage the corresponding cam chamfer.

Although the invention has been described and illustrated with reference to specific illustrative embodiments thereof, it is not intended that the invention be limited to those illustrative embodiments. Those skilled in the art will recognize that variations and modifications can be made without departing from the true scope and spirit of the invention as defined by the claims that follow. It is therefore intended to include within the invention all such variations and modifications as fall within the scope of the appended claims and equivalents thereof.

We claim:

1. A bearing retention assembly comprising:
    a bearing set having an annular outer race ring, said outer race ring having a plurality of circumferentially spaced cam chamfers defined on at least one outer circular edge thereof, wherein said cam chamfers have a cusped shape; and
    a bearing housing for capturing said bearing set, said housing including at least one integral securing member for interfering with and engaging at least one of said cam chamfers for axially and rotatably securing said outer race ring relative to said bearing housing.

2. The bearing retention assembly of claim 1 wherein said cam chamfers are symmetrically disposed along said at least one outer circular edge.

3. The bearing retention assembly of claim 1 wherein said cam chamfers are disposed along a top outer circular edge of said outer race ring and a bottom outer circular edge of said outer race ring.

4. The bearing retention assembly of claim 1 wherein said cam chamfers are symmetrically disposed along a top outer circular edge of said outer race ring and at opposing locations along a bottom outer circular edge of said outer race ring.

5. The bearing retention assembly of claim 1 wherein said at least one integral securing member is deformed on said at least one of said cam chamfers to interfere with and engage said at least one of said cam chamfers using a staking tool.

6. The bearing retention assembly of claim 1 wherein said outer race ring and said bearing housing are formed of materials having different coefficients of thermal expansion.

7. The bearing retention assembly of claim 1 wherein said bearing housing further comprises a unitary construction.

8. A bearing retention assembly comprising:
    a bearing set including an outer race ring, said outer race ring having at least one annular surface, an outer circular face, and at least one outer circular edge defined by said at least one annular surface and said outer circular face; said outer race ring defining a plurality of spaced, outwardly disposed cusped cam chamfers disposed at circumferential locations of said at least one outer circular edge.

9. The bearing retention assembly of claim 8 further comprising a bearing housing including an inner wall portion defining a bearing opening adapted for receiving said bearing set, said inner wall portion having at least one integral securing member deformed on at least one of said cam chamfers for engaging said at least one of said cam chamfers; said outer race ring being axially and rotatably secured relative to said bearing housing.

10. The bearing retention assembly of claim 9 wherein said at least one integral securing member is deformed using a staking tool.

11. The bearing retention assembly of claim 9 wherein said outer race ring and said bearing housing are formed of materials having different coefficients of thermal expansion.

12. A bearing retention assembly comprising:
a bearing set including an inner race ring, said inner race ring having at least one annular surface, an inner circular face, an inner opening defined by said inner circular face, at least one circular edge defined by said at least one annular surface and said inner circular face; said inner race ring defining a plurality of spaced, outwardly disposed cam chamfers disposed at circumferential locations of said at least one circular edge.

13. The bearing retention assembly of claim 12 further comprising a shaft for mounting within said bearing set, said shaft including a mounting portion adapted to be received within said inner opening, said mounting portion having integral securing members deformed at least partially radially outwardly on said cam chamfers for engaging said cam chamfers; said inner race ring being axially and rotatably secured relative to said shaft.

* * * * *